Inventor:
Merlin O. Petroff
By Ahlberg, Knipper & Gradolph
Attorneys

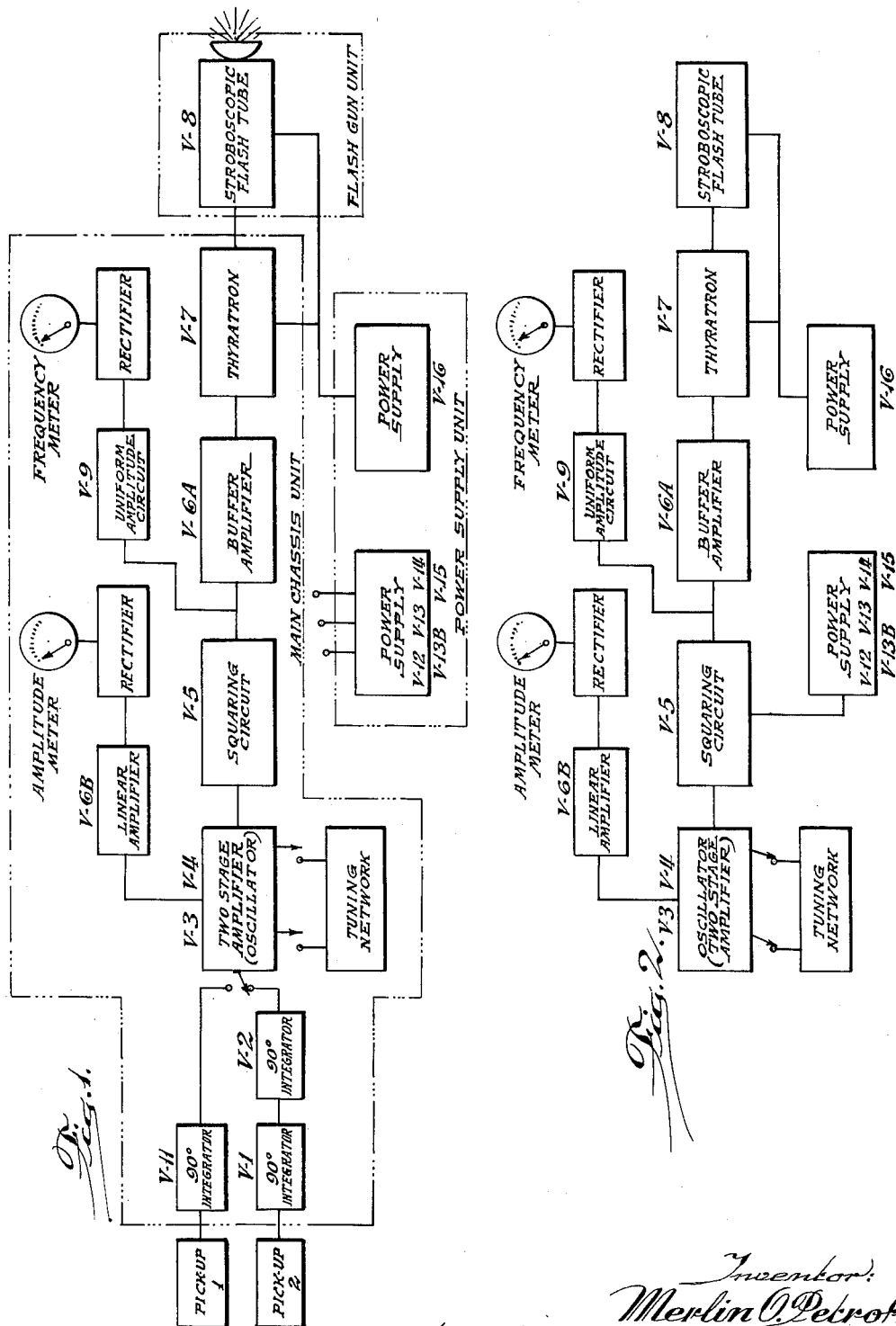

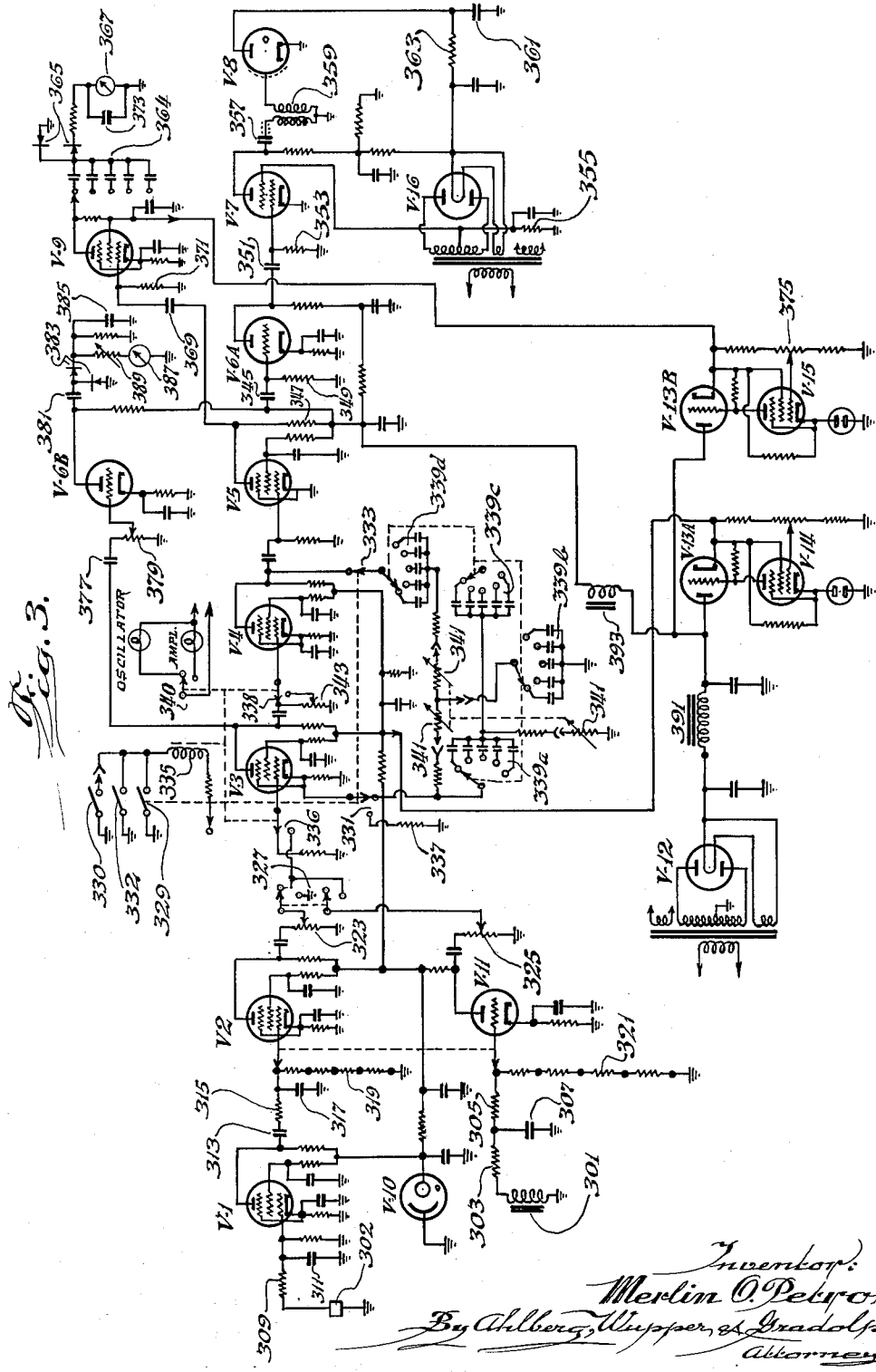

United States Patent Office 2,754,679
Patented July 17, 1956

2,754,679

VIBRATION ANALYZING EQUIPMENT

Merlin O. Petroff, Round Lake, Ill., assignor to Stewart-Warner Corporation, Chicago, Ill., a corporation of Virginia Application February 12, 1953, Serial No. 336,488

10 Claims. (Cl. 73—70)

This invention relates to vibration analyzing equipment of the electronic stroboscopic type. It is intended to provide a portable apparatus of this kind adaptable to a wide range of uses, easy to use and low in cost.

With many machines it is desirable to be able to analyze vibrations in the machine when it is operating as a complete unit and frequently after installation. Under such circumstances it often happens that several different sources of vibration will be present and one of the objects of this invention is to permit finding, isolating and analyzing these several vibrations.

Since these several vibrations may occur at widely different frequencies and intensities, it is difficult to be sure that all vibrations will be found by any system operated solely by a pick-up responsive to the vibrations. Accordingly, another object of this invention is to provide a stroboscopic scanning system operable over a wide range of frequencies generated by an independent oscillator and to provide circuit switching means so that when a vibration is found by scanning, the system may be quickly switched over to operate responsively to a vibration pick-up device at precisely the frequency established in scanning.

Another object is to provide alternate pick-up systems of different characteristics for different applications and yet to cause each to give an indication of the direction of unbalance of vibrating elements which accords with the other and with the laws of motion of the vibrating element.

Another object is to provide accurate indication of the frequency and amplitude of vibration.

Another object is to provide apparatus which is accurate yet readily portable, rugged, stable and low in cost. To this end it has been my purpose to utilize as circuit components a large number of components available at low cost because of their wide use in radio circuit practice and to devise circuits by which requisite accuracy and stability may nevertheless be obtained.

Another object is to provide an inertia responsive pick-up device of great ruggedness and freedom from stray influences.

Other objects and purposes will appear as the description of the invention proceeds.

In the drawings:

Fig. 1 is a block diagram showing the several functioning units of the apparatus when operating in response to one or the other of two alternate vibration pick-up devices;

Fig. 2 is a block diagram showing substantially the same components as those shown in Fig. 1 but operating in an alternate circuit configuration to provide stroboscopic light impulses responsive to a self-energized oscillator rather than to any external pick-up device;

Fig. 3 is a general circuit diagram of the apparatus; and

General description

Figure 4:
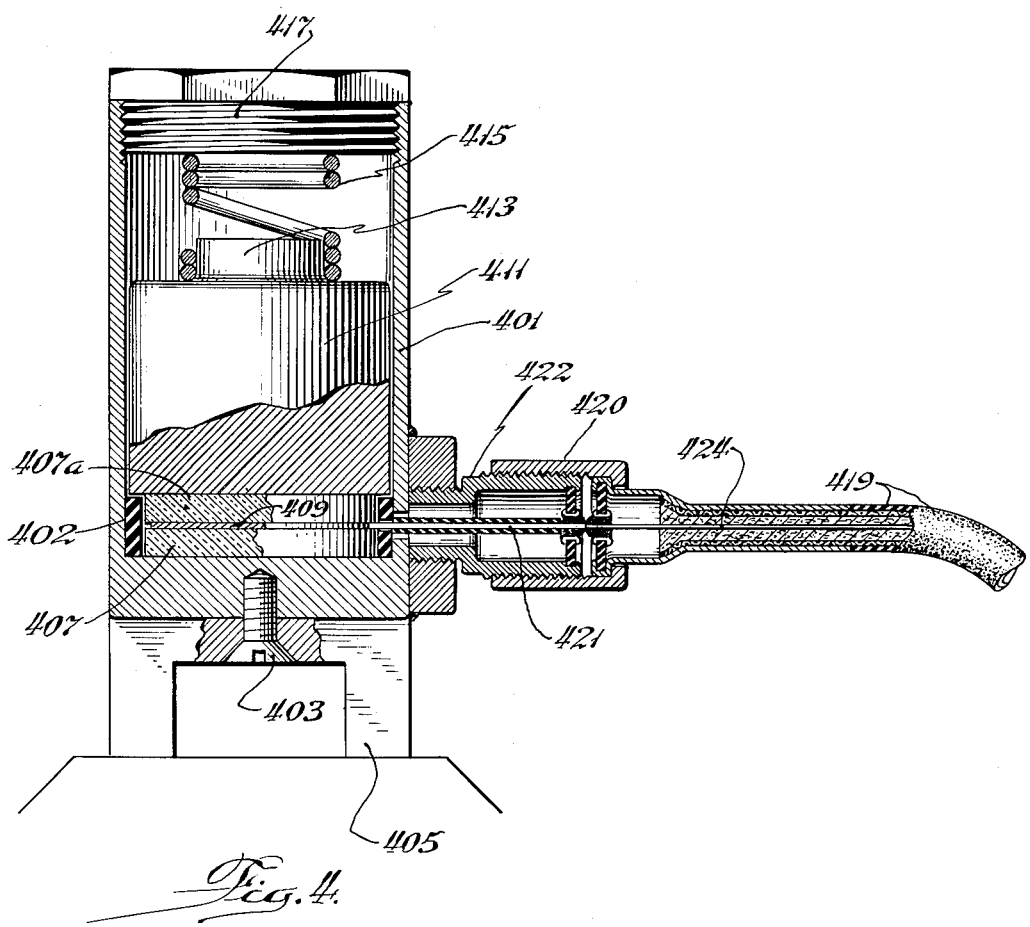
Fig. 4 is an elevation in section of the novel acceleration-responsive pick-up device used in the invention.

The general operation and arrangement of the apparatus of this invention may be understood by reference to Figs. 1 and 2 of the drawings.

The equipment is encompassed in three basic units arranged to be coupled together by cables and plugs. These three units are indicated in broken lines in Fig. 1 and comprise (1) a Main Chassis Unit, (2) a Power Supply Unit, and (3) a Flash Gun Unit. These three units are separately housed for convenient portability and use.

The Flash Gun Unit contains only the stroboscopic lamp mounted in a suitable reflector, a few associated components, and a fine-tuning system which will be referred to later in this description. Thus, this unit is very light in weight and easy to handle and is preferably fitted with a pistol-grip handle so that it may be held conveniently and easily in proximity to the moving part whose vibration is to be analyzed.

In addition to the three basic units, two alternative pick-up devices are provided. Pick-Up 1 is of the magneto type and may be of any well-known design. It is responsive to velocity and because of its response characteristics it is the pick-up of choice wherever circumstances permit its use.

But a velocity responsive pick-up requires a fixed and unmoving base point on which it may be mounted. Ordinarily, this is provided by a stand having a heavy base or clamp. The stand may have an adjustable arm holding the pick-up proper against the moving element or against a bearing around the element. It is desirable that the pick-up receive mechanical impulses through a viscous shear centering device; for example, one like that shown in United States Patent No. 2,548,809, issued April 10, 1951, to H. M. Norman for Wheel Balancer Pick-up Unit. By this means the armature of the pick-up will operate across its normal mid-position and no distortion or aberration will be introduced by biasing the armature to one side or the other. This Pick-Up 1 and its mounting do not in themselves form any part of this invention and reference to them is made only for clarity in understanding the remainder of the apparatus.

It sometimes happens that it is not practicable to use Pick-Up 1, usually because no convenient, fixed mounting place for the stand is available. With large or mobile machinery it often happens that the frame or foundation for the machine or the building in which it is housed is itself vibrating and would introduce false signals and error into any velocity responsive pick-up. For this reason it is necessary to provide an alternative Pick-Up 2. This Pick-Up 2 has several novel features and is shown in Fig. 4 and described later in detail. Suffice it to say here that it is acceleration responsive and inertia-coupled and may be clamped directly to a bearing or other vibrating element without the need for any stand or any fixed reference.

By reference to Fig. 1 it will be seen that the signal of Pick-Up 1 is passed through one stage of 90° integration while the signal of Pick-Up 2 is passed through two 90° stages. This is an important feature of the invention. The reason for this rests in the problem of providing an easily intelligible indication of the direction of unbalance.

Frequently the purpose of vibration analysis is to permit balancing a rotating member by adding or removing weight at the appropriate place. It is common to mark a rotating element with a chalk mark as a reference and then to observe the position of the chalk mark as it appears when illuminating by the flashes of the stroboscopic light. If the proper phase relationship exists between the vibration and the lamp flashes responsive to it, then the apparent position of the chalk mark relative to the position of the pick-up device provides a way of noting the direction of unbalance, so that when the machine is stopped weight may be added or removed at the right place.

But this indication depends upon the correct phase relationship between the impulses of vibration as received by a pick-up device and the flashes of the stroboscopic lamp. Here, two kinds of problems must be distinguished.

One of these is inherent in any unbalanced rotating system. At slow rotational speeds the displacement due to unbalance will be always toward the heavy side. As speed increases, a violent vibration sets in at what is known as the critical speed. Under this condition, the displacement of the moving element no longer accords with the direction of unbalance but lags behind it by 90°. As the speed passes through and above the critical speed, this lag increases to 180° so that the direction of displacement is just opposite to the direction of unbalance. This phenomenon is inherent in the moving system and even if it were possible to trigger a stroboscopic lamp precisely in accordance with maximum displacement by a displacement responsive pick-up (which under many conditions is impractical) the operator would still have to take account of this phenomenon in interpreting the indication.

This requirement for interpretation should not be complicated by additional phase shifts in the apparatus itself for then the interpretation becomes too complex for any but the most skilled operator. This raises the second problem.

A velocity response device like Pick-Up 1 delivers peak voltage when velocity is at a maximum, and in a vibrating system this occurs not at the limits of displacement (where at the instant of reversal there is no motion) but 90° beyond. Thus two peaks, each 90° beyond the two limits of displacement, are delivered. The phase is corrected by the 90° Integrator shown in Fig. 1 and only one of the peaks is used to trigger the flash tube as the Buffer Amplifier is so biased as to deliver only positive spikes to the Thyratron.

Pick-Up 2 is acceleration responsive and, as maximum inertia appears 180° out of phase with displacement, this must be corrected by two 90° Integrators.

With this arrangement the Stroboscopic Flash Tube will flash in response to vibration once each cycle and precisely in accordance with maximum displacement in one direction relative to the pick-up device, thus providing an intelligible and usable indication of the direction of unbalance.

Still referring to Figure 1 it will be seen that the signal of one or the other of the two pick-up devices is passed through a Two-Stage Amplifier which may be operated either as a broad-band amplifier or as a tuned amplifier by use of the Tunning Network. The tuned amplifier operation is important where several different frequencies of vibration are present and which would produce erratic flashes unless one frequency at a time is selected by turning.

The main driving circuit for the flash tube then consists of a Squaring Circuit to produce square waves and eliminate possibility of errors due to vagaries in wave form, a Buffer Amplifier, a Thyratron and then the Stroboscopic Flash Tube.

It is desired also to provide indication of the amplitude and frequency of vibration.

The Amplitude Meter functions by D. C. integration of the sine wave of the input signal. A signal is taken from the first stage of the Two-Stage Amplifier, is then passed through a Linear Amplifier for power gain and isolation, and then through a Rectifier and to the meter proper.

The Frequency Meter functions by integration of a number of pulses held by circuit design to standard height (voltage) and width (duration) so that the total energy per unit time is a linear function of the frequency of the pulses. A Uniform Amplitude Circuit is provided to take a signal from the Squaring Circuit and deliver pulses limited in height (voltage) by tube characteristics and width (duration) by circuit time constants. The pulses are then passed through a Rectifier, integrated and fed to the meter proper.

Fig. 2 shows the same basic components as Fig. 1 but in a different circuit configuration which eliminates any pick-up device. Instead, the elements which functioned as a tuned amplifier in Fig. 1 function as a variable frequency Oscillator so that the Stroboscopic Flash Tube flashes at the frequency of the oscillator as determined by tuning by the operator. A quick-switching arrangement permits the apparatus to be switched from pick-up operation to oscillator operation in an instant. What is important here is that the tuning circuit which determines the oscillator frequency remains precisely the same in its frequency characteristics whichever operation is used.

Without this arrangement it would be difficult in practice to be sure of detecting every vibratory frequency, for some vibrations will be violent and others quite small and it would require the closest attention to adjust and re-adjust the apparatus both as to frequency and sensitivity across the entire frequency range.

But with the arrangement of this invention the moving elements can first be scanned using the oscillator operation. Whenever a vibration is detected, the apparatus can then be transferred to pick-up operation by the flick of a switch and then it will be known that at precisely that frequency a vibration does exist. Thereupon the sensitivity adjustment may be made so as to give proper indication as to direction and amplitude as well as frequency of the vibration.

*Detailed description of pick-up integration and attenuation circuit*

Referring to Fig. 3, 90° integration of the signal of velocity-responsive pick-up 301 (referred to as Pick-Up 1 in Fig. 1) is carried out by a circuit comprising 100,000 ohm resistor 303, 2.2 megohm resistor 305 and .25 mfd. condenser 307.

Integration of the signal of the acceleration-responsive pick-up 302 (referred to as Pick-Up 2 in Fig. 1) is accomplished in two 90° stages. First, the signal is integrated 90° by 2.2 megohm resistor 309 and .1 mfd. condenser 311. The signal is then passed through tube V–1 and through blocking condenser 313. The second 90° integration is accomplished by 2.2 megohm resistor 315 and .1 mfd. condenser 317, from which point the signal is delivered to the tube V–2.

The integration of the signals of the two alternative pick-ups is partly for the purpose of establishing the correct phase relationship as previously outlined, but the integration performs another important function which is to achieve in each case a signal which is proportional to the amplitude of displacement of the vibrating member and independent of frequency. This is necessary for the following reason: The velocity-responsive pick-up 301 will deliver a signal directly proportional to amplitude and also directly proportional to frequency for at a given amplitude the velocity will increase with frequency. The acceleration-responsive pick-up 302 will deliver a signal directly proportional to amplitude of vibration but also proportional to the second power of the frequency. This is because at a given amplitude of vibration the acceleration will be proportional to the square of the frequency. It is desirable, however, that the indication of amplitude should not be distorted by the effect of frequency. This is partly to achieve simplicity in interpretation of the amplitude readings and identity of indication for each pick-up. It is also important because of the fact that quite often a fundamental vibrating frequency will have associated with it a much higher frequency of smaller amplitude. This is likely to be the situation when a rotating shaft is running in ball bearings. The shaft itself may have a vibratory frequency determined by its rotative speed. The ball bearing is then likely to have a vibratory frequency many times higher but much smaller in amplitude. If frequency is allowed to play a part in determining the strength of signal, then the high frequency signal generated by vibration in the ball bearing may override the fundamental vibrating frequency of the rotating shaft creating difficulties in operation and interpretation. The integrating circuits serve to offset these frequency effects. The result of the integration is necessarily a very considerable attenuation of the signal and one of the functions of the associated amplifier tubes (V–1 and V–2 in the case of pick-up 302, and V–11 in the case of pick-up 301) is to provide sufficient gain to offset the loss inherent in the integrator circuits. There are necessarily two integrator circuits associated with acceleration-responsive pick-up 302 because its natural response for a given amplitude of vibration increases as the second derivative or square of the frequency, while there is only one integrator circuit associated with velocity-responsive pick-up 301 because of its inherent response to frequency, which is linear.

An important feature of the pick-up system is the use of identical step attenuators in each pick-up system. These are designated by the numerals 319 and 321. Each consists of five discreet steps of resistance. The resistance values used, starting from ground, are as follows in megohms: .033, .1, .33, 1.0. Attenuation is necessary because within the wide range of amplitudes and frequency to be analyzed it would be quite difficult, and surely very costly, to provide an amplifier system which would remain linear over the entire range of operation. When the signal strength from either pick-up reaches the point indicated by the maximum indication on the amplitude meter, the signal is attenuated by manual selection of an additional step of resistance of attenuator 319 or attenuator 321. It should be noted that these attenuators are mechanically linked together, so that only a single control is necessary for both.

The values of the resistors in the attenuator have been chosen so as to provide an overlap from each step to the next. By this means, the signal delivered to the amplifier may be made either weak or strong, while still within the undistorted range of the system. This is done so that when the amplifier about to be described is used as a tuned amplifier the extent of selectivity may be in some degree controlled, with higher selectivity at the greater signal strength, as will be explained in the detailed description of the amplifier.

Each of the two pick-up systems is provided with a calibrating potentiometer, 323 and 325. By the use of these potentiometers the signal strength of the two pick-up systems may be equalized for equal vibration.

The signal from one or the other of the two pick-up systems is selected by selector switch 327 (here shown as passing the signal from pick-up 302) and then fed to the two-stage amplifier.

*The two-stage amplifier and oscillator system*

The two-stage amplifier and oscillator system, which includes tubes V–3 and V–4, is susceptible of operation as a broad-band amplifier, as a tuned amplifier, or as an oscillator. It will be convenient to describe the several components and functions of this part of the apparatus and then to describe the switching means by which it is shifted from one kind of operation to another.

For operation as a broad-band amplifier, the signal is supplied to the grid of tube V–3 through switch elements 336, which are then in the opposite position from that shown in the drawing.

The output of tube V–3 is then fed to the grid of tube V–4 through switch elements 338, which are then also in the position opposite to that shown in the drawing. The tuning network which is shown is not connected and plays no part in the operation. Switch elements 331 and 333 are then in the opposite position from that shown and bias resistor 337 is thus connected into the grid circuit of tube V–3 to provide bias offsetting the lack of feedback from the tuning network.

For operation as a tuned amplifier a tuning network is connected in feedback relationship between the plate or output side of tube V–4 and the cathode circuit of tube V–3. This is accomplished by having switch elements 331 and 333 in the position shown on the drawing. The tuning network is of the twin T-null or notch filter type and comprises three stepped banks of condensers 339a, 339b, and 339c, which are carefully matched, and a coupling bank condenser 339d. All of these bank condensers are mechanically linked for single control operation. These step condensers set the tuning roughly. Fine tuning between condenser steps is accomplished by three variable resistors 341 in the resistance arms of the network. These three variable resistors 341 are mechanically linked and are physically located in the flash-gun unit so that their adjustment is convenient to hand while the flash gun is being held close to the member being analyzed.

With this tuning network configuration, negative feedback is delivered to tube V–3 except only for signals at the tuned frequency when positive feedback is provided, thus causing high gain for the desired signal.

Referring back to step attenuators 319 and 321 in the pick-up circuits, an overlap between steps is provided so that the same signal may be delivered either at higher or lower level within the range of the amplitude meter. When the higher level is selected (in the upper 40% of the meter range) greater selectivity in the tuned amplifier will result because of greater positive feedback and, thus, greater gain for the desired signal.

It should be noted that this tuned amplifier uses only two tubes instead of the conventional three and that the feedback is introduced into the cathode circuit of V–3. This permits use of a low impedance tuning network at a considerable saving in cost, as contrasted with the conventional high impedance tuning network. This circuit also permits easy adjustment of overall gain simply by varying the coupling between tubes V–3 and V–4. This may be done by adjustment of potentiometer 343.

In the operation of the tuned amplifier it should be understood that the amount of positive feedback is always less than enough to cause oscillation; that is, it is less than the attenuation of the tuning network itself.

To cause these components to operate as an oscillator, all that is necessary is to increase the feedback and to disconnect the source of incoming signal. This is accomplished by moving switch elements 336 and 338 to the positions shown in the drawing. Switch elements 336 disconnect the source of incoming signal and substitute an appropriate grid bias. Switch elements 338 establish connection of the grid of tube V–4 to the high end of potentiometer 343, thereby increasing the gain sufficiently to cause feedback in excess of the attenuation in the tuning network. Under these conditions the components comprising tubes V–3 and V–4 and the tuning network will oscillate at the tuned frequency.

Inasmuch as the oscillating frequency is determined by the same tuning network as that which establishes the respective frequency of the tuned amplifier, the frequency of oscillation and of tuned amplification will be identical. Thus it becomes possible when using the apparatus to shift back and forth between oscillator operation and tuned-amplifier operation with the certainty that the frequency will be the same in each case. This makes it possible to find or locate a vibrational frequency by use of oscillator triggering or control and then to shift to tuned-amplifier operation at precisely the same frequency for analysis of the amplitude of vibration and direction of unbalance.

The switching means by which these foregoing components may be used as a broad-band amplifier, as a tuned amplifier, or as an oscillator, will now be described. Swith elements 329, 331 and 333 are elements of a three-element deck switch and serve primarily to shift from tuned to untuned amplifier operation. In the position shown, switch elements 329 are open and, in this position, switch elements 331 and 333 will always be in the position shown. In this condition tubes V–3 and V–4 will function as an oscillator or as a tuned amplifier as will appear. The opposite position establishes untuned amplifier circuit configuration. In this second position switch elements 329 are closed, energizing relay coil 335, and switch elements 331 and 333 are shifted to the opposite of the position shown, thereby disconnecting the tuning network so that tubes V–3 and V–4 will function as a broad-band amplifier. It is only by actuation of the switch lever associated with switch elements 329, 331 and 333 that untuned amplifier circuit configuration is achieved.

Relay coil 335 actuates switch elements 336, 338 and 340. When the relay coil is not energized, as shown in the drawing, the three switch elements will take the position shown. Switch elements 340 control pilot lamps to indicate whether the system is in condition for untuned amplifier operation or oscillator or tuned amplifier operation. The relay coil 335 may be controlled by switch 330, which is mounted in the flash lamp gun, or by switches 332 or 329, which are mounted on the main control panel. In operation a ready change may be made from oscillator position to tuned-amplifier position by actuation either of switch 330, mounted in the flash lamp gun, or by switch 332, mounted on the main panel. Switch 329, also mounted on the main panel, may be used to switch from oscillator or tuned amplifier position to broad-band amplifier position. In practice the shift from oscillator position to tuned-amplifier position will frequently be used, and it is for this reason that one of the control switches 330 is mounted in the flash lamp gun. In practice a rotating element may be "stopped" by adjusting the frequency of the oscillator so that it operates as a calibrated stroboscope. When the rotation of the shaft is precisely "stopped" then the apparatus is switched to pick-up operation for analysis of the vibration. The adjustment of the frequency during oscillator operation may be made very precise and this same frequency adjustment will be carried over into tuned-amplifier operation. This is important because, if the tuned amplifier is slightly detuned from the vibratory frequency, the result will be to produce some unintended phase shift, thus causing an unreliable indication of direction of vibration.

Because of the importance of this ability to shift back and forth between oscillator operation and tuned frequency operation, it has been part of my purpose to work out suitable circuits to assure identity of frequency in the two operations and at the same time a switching operation which is reasonable and simple. It will be seen that the switching system which has been devised is easy to handle and involves a small number of components, considering the complexity of circuit changes which might otherwise be required.

The squaring circuit

The satisfactory operation of the flash tube V–8 is dependent on careful wave shaping.

The output of the amplifier or oscillator system of tubes V–3 and V–4 is fed through a blocking condenser to a squaring tube V–5. This tube is biased in such a way that a very small signal drives the tube to saturation so that the amplitude of the square wave will be constant regardless of the initial amplitude of the signal and regardless of frequency. This is important both for accurate triggering of the flash tube and for accurate indication of frequency through the frequency meter system.

The flash lamp circuit

Still referring to Fig. 3, the flash lamp circuit comprises buffer amplifier tube V–6A, thyratron V–7, flash tube V–8 and rectifier tube V–16.

The square wave from the output of tube V–5 is fed to buffer amplifier V–6A (which is half of a 6BL7 tube; the other half, V–6B, is used in the amplitude meter circuit). Tube V–6A provides linear amplification and serves to isolate the grid current pulses of the thyratron V–7 so that they will not interfere with the operation of preceding circuits. To overcome interelectrode capacitances, a time constant is introduced in the grid circuit of V–6A by a .01 mfd condenser 345, 220,000 ohm resistor 347, and 1 megohm resistor 349.

Further differentiation to sharpen the pulses is achieved in the circuit from the plate of tube V–6A to the grid of thyratron V–7 by .001 mfd. condenser 351 and 2.2 megohm resistor 353.

The signal, as amplified and differentiated, appears at the grid of thyratron V–7 as a well-defined positive "spike" with a peak value which is constant and which lies between 70 and 80 volts.

To aid in extinguishment of the thyratron and to prevent random firing, I apply a high negative bias of 40–50 volts to the second grid of the thyratron. This voltage is obtained from the power supply by use of the drop across a 4,000 ohm resistor 355. The negative bias voltage is rapidly increased by increased plate current of the thyratron so as to cause earlier extinguishment than would result from sole reliance on the run-down of condenser 357. This negative bias helps to hold the thyratron unfired until intendedly triggered.

When the thyratron becomes conductive, it discharges .1 mfd. condenser 357, causing a surge of current in pulse transformer 359 which thus is able to deliver a high-voltage pulse from the transformer secondary to ionize the flash tube V–8, thus permitting discharge of the 1 mfd. condenser 361 through the tube, giving a flash of light. Condenser 361 is, of course, recharged immediately by the power supply system of tube V–16.

The flash gun unit

The flash tube V–8 is mounted in a gun-type holder having a pistol grip for convenience. Within the housing are included, in addition to the flash tube itself, the 1 mfd. condenser 361, its associated 4,000 ohm resistor 363, the pulse transformer 359, the variable resistors 341 of the tuning network, and a relay switch 330 by which operation may be changed easily and quickly from oscillator operation to amplifier operation.

By including the firing condenser 361 within the flash tube gun, the heavy discharge surge need not be carried through the connecting cable where, in spite of independent shielding on the leads, such a surge would disturb other circuits. Each lead in the cable to the gun unit is independently shielded and this fact, together with the circuit arrangement, permits the use of any reasonable length of cable and any desired location of the lamp gun without causing any alteration in the tuning or operation of the apparatus.

The frequency meter system

While it would be possible to calibrate the tuning network directly in frequency, this would require great precision in the circuit elements and would still be subject to error. Accordingly, I prefer to use a frequency meter arrangement.

The frequency meter circuit comprises tube V–9, range control step condenser 364, germanium diode rectifiers 365, and an indicating ammeter 367.

Square wave signals are taken from squaring tube V–5 and are partially differentiated by a .05 megohm condenser 369 in combination with a .47 megohm resistor 371.

Tube V–9 is arranged to operate at uniform amplitude. The diodes 365 rectify the output and pass a series of negative peaks to the meter 367 which is shunted by 100 mfd. condenser 373 which serves to integrate the peaks.

The voltage of the peaks is held constant by the action of tube V–9 at a level determined by the plate voltage. The width (duration) of the peaks is determined by the amount of capacity used in the range control step condenser 363. I have found that the following values in mfds., from the larger to the smaller of these condenser steps, set the ranges appropriately: .096, .0484, .0244, .0122, .0062. The individual condensers may be of adjustable type for calibrating the ranges. Overall calibration of the frequency meter may be accomplished by setting the plate voltage to tube V–9. This adjustment is carried out by 50,000 ohm potentiometer 375 physically located in the power supply unit.

Inasmuch as the peak voltage is fixed by tube V–9 and the width fixed by the condenser value established by the range switch, the total energy rate delivered to the meter will be determined solely by the frequency of the pulses. This frequency meter operates effectively over a range from 60 R. P. M. to 12,000 R. P. M.

The amplitude meter system

In addition to an indication of the frequency, it is necessary to have an indication of the amplitude of the vibration. This is accomplished in the following way: An undistorted sine wave signal is taken from the output of tube V–3 through a 1 mfd. blocking condenser 377 to triode tube V–6B, which is the other half of a 6BL7-type tube. This tube is used for isolation and low power gain. It is calibrated by potentiometer 379 in its grid circuit. The meter circuit proper comprises a 2 mfd. blocking condenser 381, two germanium diodes 383 arranged in half-wave disposition, a 10 mfd. condenser 385 for integration, and a 200 microampere Darsonval-type meter 387. The meter is calibrated by 250,000 ohm potentiometer 389. In calibrating the system, potentiometer 379 is adjusted so that the maximum allowable signal is below the level of distortion in tube V–6B. Potentiometer 389 is then used to calibrate the meter directly to the amplitude of the vibrating element. This calibration may be made in any convenient linear units. The step attenuators 319 and 321 serve to set the range of the amplitude meter, and, with the values previously indicated, provide steps of 1—3—10—30—100 linear displacement units.

The power supply

Two separate power supplies contained in the same unit are used in the apparatus. Reference has already been made to the power supply associated with rectifier tube V–16 which feeds the thyratron and flash tube. The other part of the power unit comprises another rectifier tube V–12 and two voltage regulator circuits comprising tubes V–13A and V–14, and V–13B and V–15. V–13A and V–13B are two halves of a 6BL7-type tube. With this arrangement, three plate supply voltages are available. The first of these is unregulated and is taken directly from the output of rectifier tube V12 through an inductance 391 and then through a second inductance 393. This voltage is used to supply the plate circuits of tubes V–5, V–6A and V–6B. Regulated voltage is supplied from regulating tubes V–13A and V–14 to the amplifier-oscillator comprising tubes V–3 and V–4 and to the tubes associated with the pick-up unit tubes V–1, V–2 and V–11. Gas discharge tube V–10 aids in the regulation.

A third voltage, also regulated, is taken from tubes V–13B and V–15 to supply the plate of tube V–9 in the frequency meter circuit.

The acceleration-responsive pick-up unit

In some instances, particularly where it is difficult to get a convenient fixed reference point for a velocity-responsive pick-up (as in the case of large, heavy machinery), it is easier to use a pick-up responsive to acceleration or inertia which in effect provides its own fixed reference in space by being inertia-coupled. Moreover, it is possible to make an acceleration-responsive inertia-coupled pick-up smaller than a velocity-responsive pick-up, and in some cases this will be important. The acceleration-responsive pick-up of this invention can be attached to any iron or other magnetic surface having an open area of 1½ inches square.

Referring to Fig. 4, there is provided a cylindrical casing 401 which is closed at its base and is attached in any convenient manner, for example by screw 403, to holding magnet 405. Within the cylinder is pressed an insulating sleeve 402 which extends sufficiently up the length of the casing 401 to insulate the electrically sensitive elements. The closed base of cylinder 401 is lapped on its inside surface and silvered and polished. There are then placed within the cylinder the following elements in order: First, barium titanate sensitive element 407 properly polarized, then a thin silver disc 409, then a second barium titanate sensitive element 407a properly polarized, then a cylindrical weight 411 having a reduced spring guide portion 413, a biasing spring 415 and screw-threaded cover 417 adapted to be screwed into the cylindrical casing 401. Both of the flat surfaces of each of the sensitive elements 407 and 407a are lapped and silvered. So, also, is the bearing surface of weight 411. Likewise the thin silver disc 409 is lapped and polished. The reason for this is to assure that all of the surfaces, which constitute a part of the electrical circuit for the generated signal, press together with uniform pressure over their entire surfaces, and are free from any errant couples of metals or metal salts which would introduce error into the response and to avoid localized stresses which could fracture the barium titanate elements if subjected to high accelerations.

The barium titanate sensitive elements 407 and 407a have piezo-electric properties and produce an electric potential responsive to deformation. The deformation in this instance is occasioned by the variable force exerted by weight 411 in response to acceleration. The two sensitive elements 407 and 407a are arranged back to back electrically in the sense that, upon compression, both show positive or negative potential at the faces touching silver disc 409.

Electrical connections are made through a shielded cable 419, which in practice is a coaxial cable with its outer braid conductor grounded to the case 401. The cable is connected in the well-known manner through a conventional plug 420 and its associated receptacle 422, thereby connecting the central conductor 424 of the cable 419 to receptacle contact 426, which in turn is electrically connected to a lug 421 extending from silver disc 409 through an opening in insulating sleeve 402, which is brought into registry with an opening opposite the connecting receptacle in cylindrical casing 401.

By this arrangement the "hot" signal potential appears only at the surfaces of silver disc 409, where it is completely surrounded and shielded by the casing 401 and by the moving elements, all of which are at ground potential. Indeed, since the sensitive elements 407 and 407a are at ground potential on their outer faces, they also serve to shield the "hot" area. This shielding is important because in many machines which are to be analyzed there are stray fields generated either by magnetic circuits as in motor windings or by electrical circuits. Not infrequently such stray fields have a rhythmic characteristic; and, because of the nature of the circuits used in my invention and the nature of its operation, such rhythmic strays, if picked up through the pick-up device, would produce erroneous and confusing indications.

In addition to this important aspect of the acceleration-responsive pick-up device, this invention results in a very rugged construction of what is inherently a sensitive instrument. In this connection it is important that biasing spring 415 be quite strong, exerting a force of 60 to 75 pounds in assembled position. This force makes it unlikely that weight 411 will ever become unseated in such a way as to deliver a hammer blow to the sensitive elements 407 and 407a, which might be damaged thereby. So effective has this arrangement been, that the pick-up has been repeatedly dropped from a height of three feet onto a steel block without loss of sensitivity or calibration.

It will thus be seen that this invention results in a vibration analyzer which is highly portable, of wide and varied application, easy to use and understand, low in cost, and rugged and stable in characteristics.

It will be understood that variations in detail may be made without departing from the spirit of the invention, and I do not intend to limit myself to the precise forms shown and described, but only by the following claims:

I claim:

1. In stroboscopic vibration analysis apparatus, a stroboscopic lamp, a power supply for said stroboscopic lamp, triggering means connected for supplying illuminating pulses to said lamp when said triggering means is supplied with oscillations, an amplifier-oscillator unit connected for feeding said triggering means and including a tuning network and arranged to operate in one circuit configuration as an amplifier and in a second circuit configuration as an oscillator, pick-up means comprising means for translating vibratory movements into electrical oscillatory signals and means for feeding said signals to said amplifier-oscillator unit, and rapid switching means connected for switching from amplifying circuit configuration to oscillating circuit configuration, said switching means connecting said pick-up means to said amplifier-oscillator unit when said switching means switches to amplifier circuit configuration and disconnecting said pick-up means when said switching means switches to oscillator circuit configuration.

2. In stroboscopic vibration analysis apparatus including a flash tube, power supply and triggering means for firing said flash tube in response to oscillatory signals, and a pick-up device for deriving an oscillatory signal from a vibrating member to be analyzed, the improvement which consists of circuits connected for supplying oscillations to said triggering means, said circuits including elements operating in one circuit configuration as a variable tuned frequency amplifier having input connections for an oscillatory signal to be amplified, and quick switching means for altering circuit configuration to cause the same said elements to operate as an oscillator producing oscillations at the tuned frequency, and means acting to connect said pick-up to said input connections when said circuits are switched to tuned amplifier configuration and to disconnect said pick-up when said circuits are switched to oscillator configuration, whereby said flash tube may be caused to operate selectively in response either to oscillating signals derived by said pick-up device and amplified through said circuits at a tuned frequency or to oscillations produced by said circuits at the same frequency.

3. In stroboscopic vibration analysis apparatus including a flash tube, a power supply and a triggering means for firing said flash tube in response to oscillatory signals fed thereto, and a pick-up device for deriving an oscillatory signal from a vibrating member to be analyzed, the improvement which consists of an oscillator-tuned frequency amplifier means for feeding to said triggering means alternatively either a self-generated oscillatory first signal or an oscillatory second signal derived from said pick-up device and amplified at a tuned frequency, said oscillator-amplifier means including one and only one adjustable tuning network controlling both the frequency of the self-generated oscillatory signal and the tuned frequency of amplification of the signal derived by said pick-up device and quick switching means for feeding the first signal to said triggering means and for disconnecting said pick-up device from said oscillator-amplifier, or in the alternative position for feeding the second signal to said triggering means and for connecting said pick up device to said oscillator-amplifier.

4. In stroboscopic vibration analysis apparatus a flash tube, a power supply and triggering circuits for firing said flash tube at a frequency and phase determined in response to an oscillatory signal delivered thereto, a pick-up device in contact with a vibrating member to be analyzed and adapted to produce an oscillatory signal in response thereto, means for delivery of oscillatory signals to said triggering circuits selectively either from self-generated oscillations or from said pick-up device, said means including an amplifier-oscillator having a tuning network in feed-back connection and quick-switching gain control means for controlling the degree of feed-back whereby feed-back may be set at one level to achieve tuned frequency amplifier operation of said amplifier-oscillator or at a higher level to achieve oscillator operation of said amplifier-oscillator at the same frequency as the tuned frequency of amplifier operation, and means for connecting said pick-up device to said amplifier-oscillator when said quick-switching means is shifted to amplifier position and for disconnecting said pick-up when said quick-switching means is shifted to oscillator position.

5. Stroboscopic vibration analysis apparatus including in combination a flash tube, a power supply and triggering circuits for firing said flash tube at a frequency and phase determined by an oscillatory signal delivered thereto, and means for delivering an oscillatory signal to said triggering circuits including pick-up means for producing an oscillatory signal and amplifier-oscillator means selectively operable either as a tuned amplifier of oscillatory signals produced by said pick-up means to amplify and feed said oscillatory signals to said circuits or alternatively as an oscillator to generate an oscillatory signal to be fed to said circuits, said amplifier-oscillator means including an adjustable tuning network connected in feeb-back relationship and quick-switching means for altering the degree of feed-back through said tuning network whereby said amplifier-oscillator means may function at lower feed-back level as a tuned frequency amplifier or at a higher feed-back level as an oscillator, the tuned frequency of amplifier operation and the frequency of oscillator operation being substantially identical, and means for disconnecting said pick-up means when said amplifier-oscillator means is functioning as an oscillator.

6. In stroboscopic vibration analysis apparatus including a flash tube and wave-shaping and triggering circuits for firing said flash tube at a frequency and phase determined by an oscillatory signal delivered to said circuits, the improvement which consists of means for delivering an oscillatory signal to said circuits including pick-up means adapted to provide primary oscillatory signals and a tuned amplifier for receiving and amplifying said primary signals from said pick-up at a selected frequency and for delivering the amplified, selected-frequency signal to said wave-shaping and triggering circuits, said tuned amplifier including a tuning network, switching means for causing said amplifier to oscillate at the frequency established by said tuning network and for disconnecting said pick-up means from said amplifier, whereby said amplifier oscillates at the tuned frequency of said tuning network to deliver an oscillatory signal to said wave-shaping and triggering circuits at the same frequency as that amplified by said tuned amplifier.

7. In stroboscopic vibration analysis apparatus which includes a flash tube, firing means for firing said flash tube in a predetermined response to an oscillatory signal and pick-up means for deriving a primary oscillatory signal from a vibrating member to be analyzed, the improvement which includes circuit means coupled to said firing means and adapted selectably either to receive a primary oscillatory signal from the pick-up means and to amplify the primary oscillatory signal at any of a wide range of adjustable tuned frequencies or to generate an oscillatory signal at a frequency identical to the tuned frequency, and switching means adapted in one position to connect said pick-up means to said circuit means and to cause said circuit means to operate as an amplifier, and in another position to disconnect said pick-up from said circuit means and to cause said circuit means to generate an oscillatory signal.

8. Stroboscopic vibration analysis apparatus including in combination a flash tube, electric supply means for said flash tube, wave-shaping and triggering means to trigger said flash tube in response to oscillatory signals, means for feeding an oscillatory signal to said wave-shaping and triggering means including a tuned amplifier having a limited amplitude range of linearity and having a variable frequency selectivity roughly proportional to signal strength, pick-up means for generating oscillatory signals in response to vibration and for feeding the signal to said amplifier and stepped attenuation means interposed between said pick-up means and said tuned amplifier, the steps of said attenuator being proportioned to overlap so that a given signal may be selectively fed to said tuned amplifier either at higher or lower amplitude level within the range of linearity of said tuned amplifier whereby greater or lesser frequency selectivity of said tuned amplifier may be selectively obtained.

9. In stroboscopic vibration analysis apparatus including a stroboscopic flash tube, an energizing means, and a triggering means therefor responsive to an oscillatory signal, amplifying means adapted to receive an oscillatory signal and to supply an amplified oscillatory signal to said triggering means in a certain phase relationship to said received signal, means for deriving oscillatory signals from a vibrating element to feed said amplifying means including two alternatively selectable pick-up means for translating mechanical vibration into oscillatory signals, one of said pick-up means being essentially velocity responsive and requiring a fixed base of attachment and the other of said pick-up means being essentially acceleration responsive and not requiring a fixed base of attachment, said alternatively selectable pick-up means being characterized by different phase and amplitude response to the same mechanical vibration and each having operatively coupled therewith phase shifting and amplitude-corrective circuits such that the signals of each pick-up means are corrected to provide oscillatory signals from said corrective circuits of substantially equal amplitude and substantially identical phase relationship in response to any given mechanical vibration over a wide range of amplitude and frequency of vibration, and switching means for connecting the output of either corrective circuit optionally to said amplifying means.

10. A readily portable vibration analysis apparatus consisting of the combination of a first mechanically separate unit including means forming a power supply, a second mechanically separate unit including a flash tube, a power supply condenser for feeding power pulses to said flash tube directly and without conducting such power pulses through external cables and a pulse transformer for receiving pulse signals and in response thereto triggering power pulses to said flash tube, a third mechanically separate unit including an amplifier-oscillator susceptible of operation selectively as a broad-band amplifier or as a tuned-frequency amplifier of oscillatory signals or as an oscillator, and including wave-shaping and triggering circuits for feeding signals to said pulse transformer, a fourth mechanically separate unit constituting a pick-up device adapted to make contact with a vibrating member to be analyzed and to produce an oscillatory signal in response to mechanical vibration, external quick-disconnect cables delivering power from said power supply to said second and third mechanically separate units and for passing signals from said fourth unit to said third unit and from said third unit to said second unit, and switching means for connecting or disconnecting said pick-up device and said amplifier-oscillator, said switching means also operating to cause said amplifier-oscillator to oscillate when said pick-up is disconnected from said amplifier-oscillator.

References Cited in the file of this patent

UNITED STATES PATENTS

| | | |
|---|---|---|
| 2,275,256 | Fried | Mar. 3, 1942 |
| 2,322,561 | Bevins et al. | June 22, 1943 |
| 2,331,317 | Germeshausen | Oct. 12, 1943 |
| 2,352,219 | Olesen | June 27, 1944 |
| 2,383,588 | Bousky | Aug. 28, 1945 |
| 2,411,401 | Welch | Nov. 19, 1946 |
| 2,486,896 | Weaver et al. | Nov. 1, 1949 |
| 2,521,141 | Allen | Sept. 5, 1950 |
| 2,616,288 | Mesa | Nov. 4, 1952 |
| 2,711,647 | Ongaro et al. | June 28, 1955 |